(12) United States Patent
Ishibashi et al.

(10) Patent No.: US 7,895,733 B2
(45) Date of Patent: Mar. 1, 2011

(54) SCREWING APPARATUS AND METHOD OF CONTROLLING SCREWING OPERATION

(75) Inventors: Hajime Ishibashi, Shiki (JP); Satoru Osada, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/496,462

(22) Filed: Jul. 1, 2009

(65) Prior Publication Data

US 2009/0260209 A1  Oct. 22, 2009

Related U.S. Application Data

(63) Continuation of application No. PCT/JP2007/050618, filed on Jan. 17, 2007.

(51) Int. Cl.
*B23P 21/00* (2006.01)
*G06F 19/00* (2006.01)

(52) U.S. Cl. .......................................... 29/709; 700/95

(58) Field of Classification Search .............. 29/407.02, 29/256, 525.11, 407.01, 407.03, 407.05, 29/407.04, 525.01, 709, 712, 714, 720, 721, 29/281.1; 700/95
See application file for complete search history.

(56) References Cited

FOREIGN PATENT DOCUMENTS

| JP | A 63-156627 | 6/1988 |
|---|---|---|
| JP | A 6-190742 | 7/1994 |
| JP | A 6-297269 | 10/1994 |
| JP | A 11-77453 | 3/1999 |
| JP | A 11-188655 | 7/1999 |
| JP | A 2005-267720 | 9/2005 |

*Primary Examiner*—John C Hong
(74) *Attorney, Agent, or Firm*—Greer, Burns & Crain, Ltd.

(57) ABSTRACT

A screwing apparatus includes a support member having a horizontal support surface. A single urging member has an urging surface opposed to the support surface. The urging surface is set parallel to the support surface. A driving mechanism is configured to drive at least one of the support member and the urging member to move to change the distance between the support member and the urging member. Driver bits have the tip ends opposed to the support surface, respectively. The driver bits are driven to move toward and away from the urging surface.

7 Claims, 12 Drawing Sheets

SCREWING APPARATUS AND METHOD OF CONTROLLING SCREWING OPERATION

CROSS-REFERENCE TO RELATED APPLICATION

This application is a continuing application, filed under 35 U.S.C. §111(a), of International Application PCT/JP2007/050618, filed on Jan. 17, 2007, the contents of which are incorporated herein by reference.

FIELD

The embodiments discussed herein are related to a screwing apparatus including a support member having a horizontal support surface, and driver bits each having a tip end opposed to the support surface, the driver bits each driven to move toward and away from the support surface.

BACKGROUND

A product is set on the upward horizontal support surface in the screwing apparatus. The driver bits are driven to move downward in the vertical direction toward the product. Screws are held at the tip ends of the driver bits, respectively. The screws are received in the screw bores of the product, respectively. Moving further downward, the driver bits are driven to rotate around the axes of the driver bits, respectively. The screws are in this manner screwed into the screw bores, respectively.

A cover is screwed on an enclosure body to assemble a hard disk drive, for example. Screws, six of those, are utilized for screwing the cover on the enclosure body, for example. The cover is placed on the enclosure body to close the opening of the enclosure body. An elastic packing is sandwiched between the enclosure body and the cover. The screwing apparatus effects the screwing operation simultaneously on all the screws.

The screwing apparatus tends to suffer from differences between the levels of the driver bits during the screwing operation. The differences in the levels cause the cover to suffer from deviation from the horizontal attitude. This results in differences between the screwed amounts of the screws. A sufficient sealing effect thus cannot be obtained between the cover and the enclosure body.

SUMMARY

According to a first aspect of the present invention, there is provided a screwing apparatus comprising: a support member having a horizontal support surface; a single urging member having an urging surface opposed to the support surface, the urging surface being parallel to the support surface; a driving mechanism configured to drive at least one of the support member and the urging member to move to change the distance between the support member and the urging member; and driver bits having the tip ends opposed to the support surface, respectively, the driver bits each driven to move toward and away from the urging surface.

According to a second aspect of the present invention, there is provided a screwing apparatus comprising: a support member having a horizontal support surface; driver bits each having the tip end opposed to the support surface, the driver bits each driven to move toward and away from the support surface; driving sources assigned to the driver bits, respectively, the driving sources each driving corresponding one of the driver bits to rotate around the axis of the corresponding one of the driver bits; level detector circuits assigned to the driver bits, respectively, the level detector circuits each detecting the movement distance of corresponding one of the driver bits in the axial direction of the corresponding one of the driver bits; and a controller circuit configured to identify the detection of the movement distance smaller than a specific value, the controller circuit configured to supply a control signal for reverse rotation to any of the driving sources, the any of the driving sources being assigned to any of the driver bits that is related to the movement distance smaller than the specific value.

According to a third aspect of the present invention, there is provided a method of controlling a screwing operation, comprising: supplying control signals to driving sources, respectively, the driving sources each associated with individual one of driver bits, the control signals each configured to drive corresponding one of the driver bits for rotation by a predetermined torque around the axis of the corresponding one of the driver bits; monitoring the movement distance of each of the driver bits; and identifying the detection of the movement distance smaller than a specific value, for supplying a control signal for reverse rotation to any of the driving sources assigned to any of the driver bits that is related to the movement distance smaller than the specific value.

According to a fourth aspect of the present invention, there is provided a screwing apparatus comprising: a support member having a horizontal support surface; driver bits each having the tip end opposed to the support surface, the driver bits each driven to move toward and away from the support surface; driving sources assigned to the drive bits, respectively, the driving sources each driving corresponding one of the driver bits to rotate around the axis of the corresponding one of the driver bits; torque sensors assigned to the driver bits, respectively, the torque sensors each detecting torque on corresponding one of the driver bits; and a controller circuit configured to identify the detection of the torque larger than a specific value, the controller circuit configured to supply a control signal for reverse rotation to any of the driving sources, the any of the driving sources being assigned to any of the driver bits that is related to the torque larger than the specific value.

According to a fifth aspect of the present invention, there is provided a method of controlling a screwing operation, comprising: supplying control signals to driving sources, respectively, the driving sources each associated with individual one of driver bits, the control signals each configured to drive corresponding one of the driver bits for rotation by a predetermined torque around the axis of the corresponding one of the driver bits; monitoring torque on each of the driver bits based on a torque sensor; and identifying the detection of the torque larger than a specific value, for supplying a control signal for reverse rotation to any of the driving sources, the any of the driving sources being assigned to any of the driver bits that is related to the torque larger than the specific value.

The object and advantages of the embodiment will be realized and attained by means of the elements and combinations particularly pointed out in the appended claims. It is to be understood that both the foregoing general description and the following detailed description are exemplary and explanatory and are not restrictive of the embodiment, as claimed.

DESCRIPTION OF EMBODIMENTS

Description will be made below on embodiment of the present invention with reference to the attached drawings.

Figure 1:
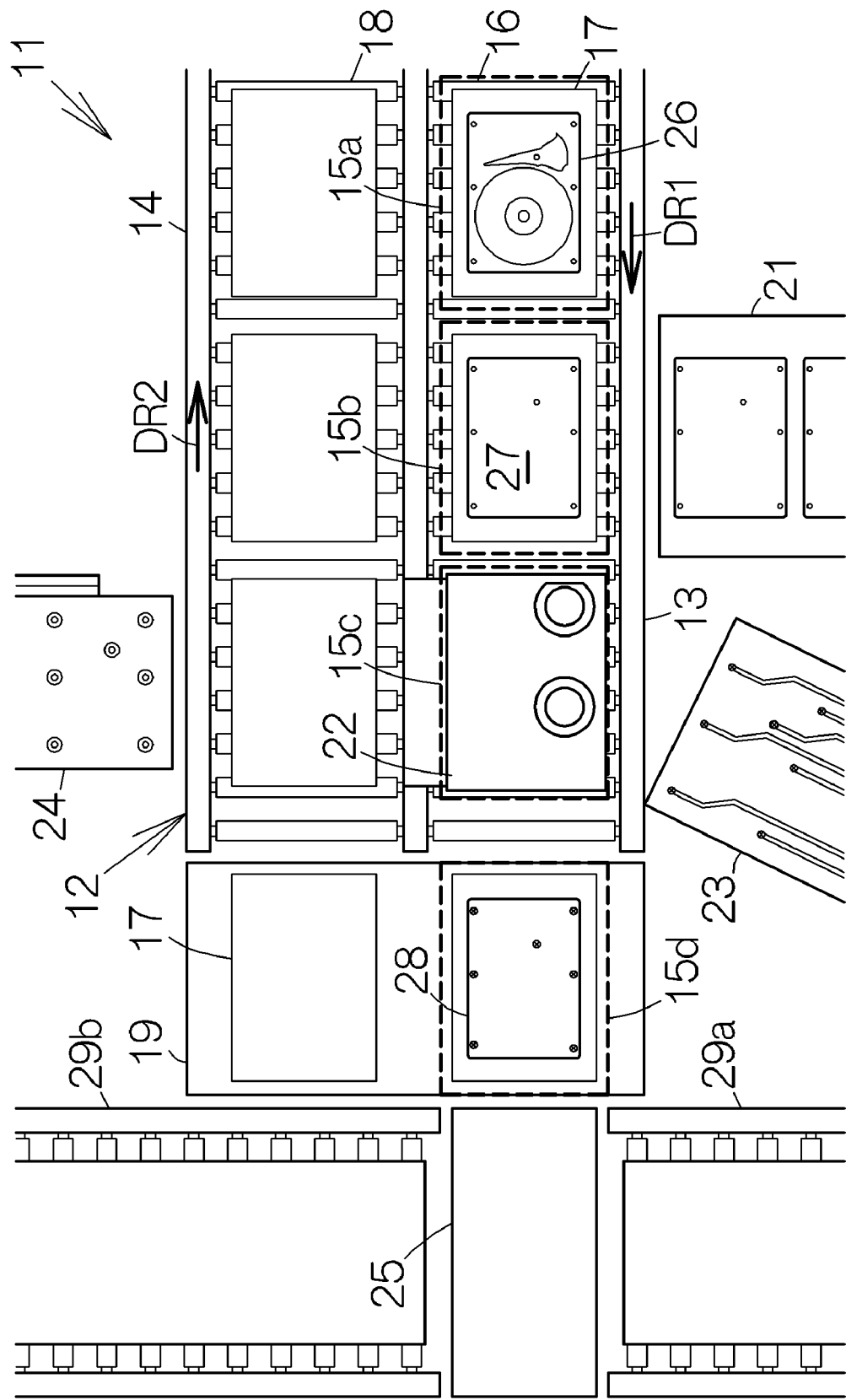
FIG. 1 is a plan view schematically illustrating the structure of a screwing line.

FIG. 1 schematically illustrates a screwing line 11 according to a first embodiment of the present invention. The screwing line 11 includes a transporting mechanism 12. The transporting mechanism 12 includes first and second roller conveyors 13, 14 extending in parallel with each other along a horizontal plane. The first roller conveyor 13 passes through first, second, third and fourth stations 15a, 15b, 15c, 15d. The first roller conveyor 13 utilizes the rotation of rollers 16 around the respective longitudinal axes to transport a pallet or pallets 17 along the horizontal plane in a first direction DR1. Likewise, the second roller conveyor 14 utilizes the rotation of rollers 18 around the respective longitudinal axes to transport the pallet or pallets 17 along the horizontal plane in a second direction DR2 opposite to the first direction DR1.

A feeding mechanism 19 is connected to the first roller conveyor 13 at the fourth station 15d. The feeding mechanism 19 is connected to an end of the second roller conveyor 14. The feeding mechanism 19 serves to transport the pallet 17 from the first roller conveyor 13 to the second roller conveyor 14. The pallet 17 passes through the first to fourth stations 15a, 15b, 15c, 15d in this sequence. The pallet 17 is fed to the second roller conveyor 14 at the fourth station 15d.

A cover supplying unit 21 is related to the second station 15b. The cover supplying unit 21 is configured to supply a cover of a hard disk drive, HDD, to the pallet 17 in the second station 15b. A screwing apparatus 22 and a screw supplying unit 23 are related to the third station 15c. The screwing apparatus 22 performs a screwing operation on a product on the pallet 17. Screws are supplied to the screwing apparatus 22 from the screw supplying unit 23. Here, a cleaning unit 24 is related to the screwing apparatus 22. The screwing apparatus 22, the screw supplying unit 23 and the cleaning unit 24 will be described later in detail. A product taking-out unit 25 is related to the fourth station 15d. The product taking-out unit 25 serves to take out the product from the pallet 17.

As depicted in FIG. 1, the pallet 17 is put into the screwing line 11 at the first station 15a. A base 26 of a hard disk drive is supported on the pallet 17. A magnetic recording disk, a carriage assembly and the other components are beforehand mounted on the base 26.

When the pallet 17 enters the second station 15b, a cover 27 is placed on the base 26 on the pallet 17. The cover supplying unit 21 supplies the cover 27. When the pallet 17 enters the third station 15c, the screwing apparatus 22 screws the cover 27 on the base 26. The cover 27 is fixed on the base 26. When the pallet 17 enters the fourth station 15d, the hard disk drive 28 is taken out from the pallet 17. The product taking-out unit 25 selectively feeds the hard disk drive 28 to a non-defective product conveyor 29a and a defective product conveyor 29b. If the hard disk drive 28 is non-defective, the hard disk drive 28 is fed to the non-defective product conveyor 29a. If the hard disk drive 28 is defective, the hard disk drive 28 is fed to the defective product conveyor 29b. After the hard disk drive 28 has been removed, the pallet 17 is fed to the second roller conveyor 14 based on the operation of the feeding mechanism 19. The empty pallet 17 is transported out through the second roller conveyor 14.

Figure 2:
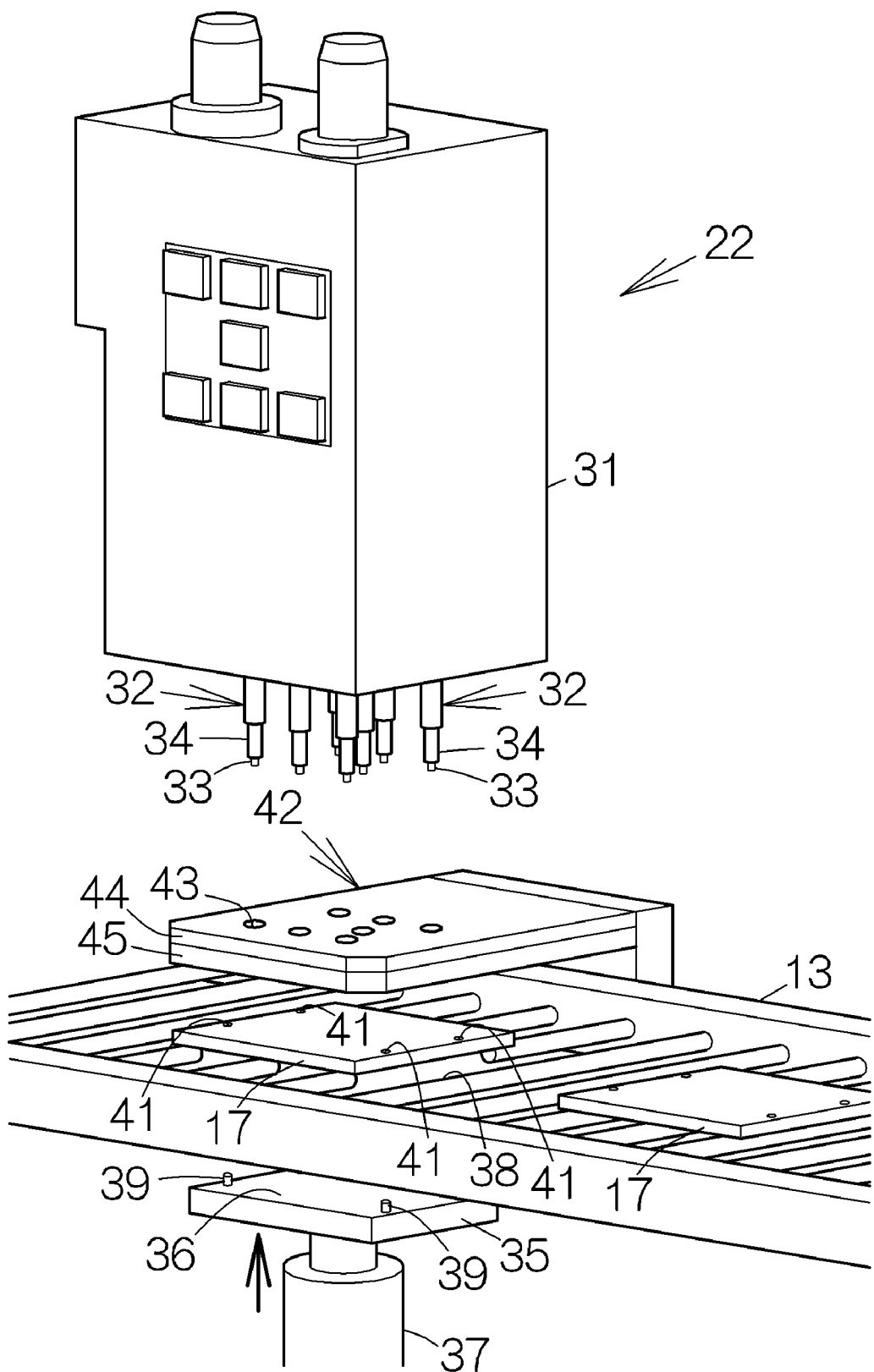
FIG. 2 is an enlarged perspective view of a screwing apparatus.

FIG. 2 depicts the screwing apparatus 22. The screwing apparatus 22 includes a screwing head 31. Driver units 32, seven of those, are supported on the screwing head 31, for example. The screwing head 31 moves upward and downward in the vertical direction. A lifting mechanism, not illustrated, may be coupled to the screwing head 31 for the upward and downward movement of the screwing head 31, for example. The screwing head 31 is disposed above the first roller conveyor 13.

The individual driver unit 32 includes a driver bit 33. The driver bit 33 is kept in a vertical attitude. The driver bit 33 is held for relative rotation around its longitudinal or vertical axis. A downward urging force is applied to the driver bit 33 as described later.

The driver bit 33 is received in a sleeve 34. The sleeve 34 moves upward and downward in the direction of the longitudinal axis of the driver bit 33. A downward urging force is applied to the sleeve 34 as described later. The driver unit 32 will be described later in detail.

A support member 35 is opposed to the tip ends of all the driver bits 33. The support member 35 defines a horizontal support surface 36. The tip ends of the driver bits 33 are opposed to the horizontal support surface 36. A lifting mechanism 37 allows the support member 35 to move upward and downward in the vertical direction. The upward and downward movement of the support member 35 realizes the horizontal support surface 36 moving between a position below the first roller conveyor 13 and a position above the first roller conveyor 13. An opening 38 is defined in the first roller conveyor 13 to enable the upward and downward movement of the support member 35 in the vertical direction. Two pairs of protrusions 39, one pair not illustrated, are formed on the horizontal support surface 36, for example. The protrusions 39 stand upright from the horizontal support surface 36. The positional relationship of all the protrusions 39 reflects that of positioning holes 41 formed in the pallet 17.

A single urging member 42 is placed between the tip ends of the driver bits 33 and the horizontal support surface 36. The single urging member 42 is stationarily disposed at a predetermined level above the first roller conveyor 13. Seven through holes 43 are formed in the single urging member 42 to respectively receive the driver bits 33. The single urging member 42 is configured to support the vertical movement of the support member 35. The urging member 42 includes a sleeve guide plate 44 at an upper position and a sleeve stop plate 45 at a lower position. The sleeve guide plate 44 is overlaid on the upper surface of the sleeve stop plate 45. The through holes 43 penetrate through the sleeve guide plate 44 and the sleeve stop plate 45. The sleeve guide plate 44 and the sleeve stop plate 45 may be made of a metallic plate or a resin plate, for example. The sleeve guide plate 44 and the sleeve stop plate 45 have a predetermined rigidity. Here, the lifting mechanism 37 of the support member 35 functions as a driving mechanism configured to change the distance between the support member 35 and the single urging member 42.

Figure 3:
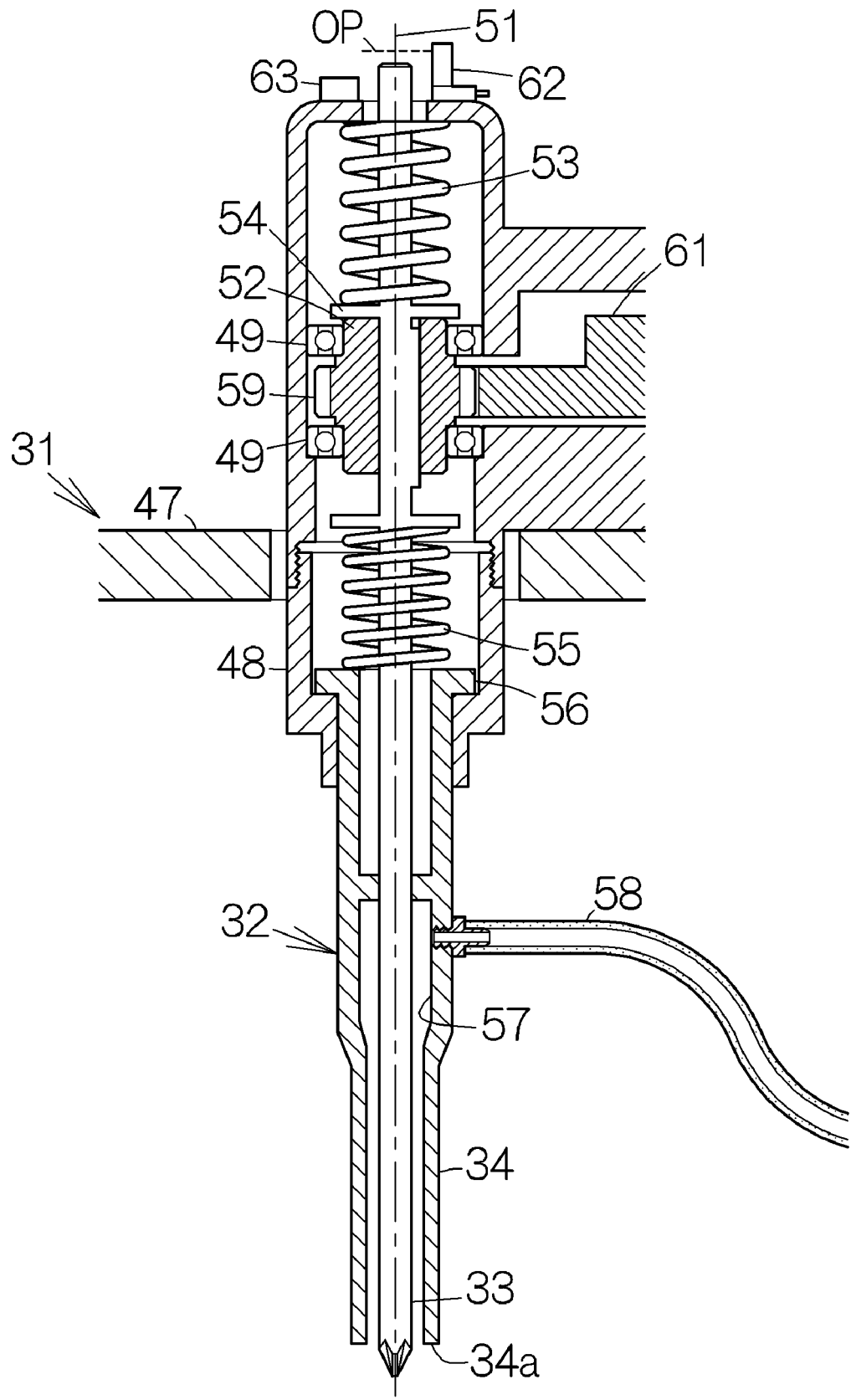
FIG. 3 is an enlarged sectional view schematically illustrating a driver unit.

As depicted in FIG. 3, the individual driver unit 32 includes a body 48 supported on a horizontal plate 47 of the screwing head 31. A pair of bearings 49, namely the upper and lower bearings 49 are placed in the body 48. The bearings 49 serve to support a cylindrical member 52 for relative rotation around a vertical axis 51. The driver bit 33 penetrates through a hollow space inside the cylindrical member 52. Relative rotation is prevented between the driver bit 33 and the cylindrical member 52 around the vertical axis 51. Simultaneously, the driver bit 33 is allowed to move relative to the cylindrical member 52 in the vertical direction. A spline structure may be established between the outer peripheral surface of the driver bit 33 and the inner surface of the cylindrical member 52 for the prevention of the relative rotation and the relative movement in the vertical direction.

A first coil spring 53 is interposed between the driver bit 33 and the body 48. The first coil spring 53 serves to apply a downward urging force to the driver bit 33. An outward flange 54 is formed on the driver bit 33. The cylindrical member 52 underprops the flange 54. The flange 54 serves to restrict the downward movement of the driver bit 33. The first coil spring 53 serves to urge the flange 54 downward against the cylindrical member 52.

The sleeve 34 is supported on the body 48 below the upper and lower bearings 49. The driver bit 33 penetrates through the hollow space inside the sleeve 34. The sleeve 34 is coupled to the body 48 for relative movement in the vertical direction. A second coil spring 55 is interposed between the driver bit 33 and the sleeve 34. The second coil spring 55 exhibits elasticity to separate the driver bit 33 upward from the sleeve 34. The second coil spring 55 serves to apply a downward urging force to the sleeve 34. An outward flange 56 is formed on the outer peripheral surface of the sleeve 34 at the uppermost position of the sleeve 34. The body 48 underprops the flange 56. The flange 56 serves to restrict the downward movement of the sleeve 34. The second coil spring 55 serves to urge the flange 56 downward against the body 48. The elasticity of the second coil spring 55 is set smaller than that of the first coil spring 53.

A negative pressure chamber 57 is defined inside the sleeve 34 at the lower end of the sleeve 34. The driver bit 33 penetrates through the negative pressure chamber 57 in the vertical direction. A decompressor, not illustrated, is connected to the negative pressure chamber 57. An air inlet pipe 58 is utilized for connect the decompressor to the negative pressure chamber 57. One end of the air inlet pipe 58 is coupled to the outer peripheral surface of the sleeve 34. The other end of the air inlet pipe 58 is coupled to the decompressor. In this manner, the negative pressure chamber 57 can be decompressed. A negative pressure is established in the negative pressure chamber 57. A suction force is generated at an opening 34a of the sleeve 34 based on the negative pressure.

A gear 59 is formed on the outer peripheral surface of the cylindrical member 52. A predetermined driving mechanism 61 is coupled to the gear 59. The driving mechanism 61 serves to transmit a driving force to the gear 59. The driving force is generated at a driving source such as an electric motor, not illustrated. The electric motor and the gear 59 in combination causes the driver bit 33 to rotate around its longitudinal axis, namely the vertical axis 51.

A photosensor 62 is related to the driver bit 33. The photosensor 62 outputs an optical beam OP to the extension of the driver bit 33 above the driver bit 33, for example. When the driver bit 33 moves upward relative to the body 48 in the vertical direction by a predetermined distance, the photosensor 62 receives a reflected light from the driver bit 33. In this manner, the photosensor 62 detects the upward movement of the driver bit 33. The photosensor 62 outputs a detection signal upon the detection. Here, the photosensor 62 functions as a level detector circuit. A torque sensor 63 is also related to the driver bit 33. The torque sensor 63 detects the effective torque of the driver bit 33.

Figure 4:
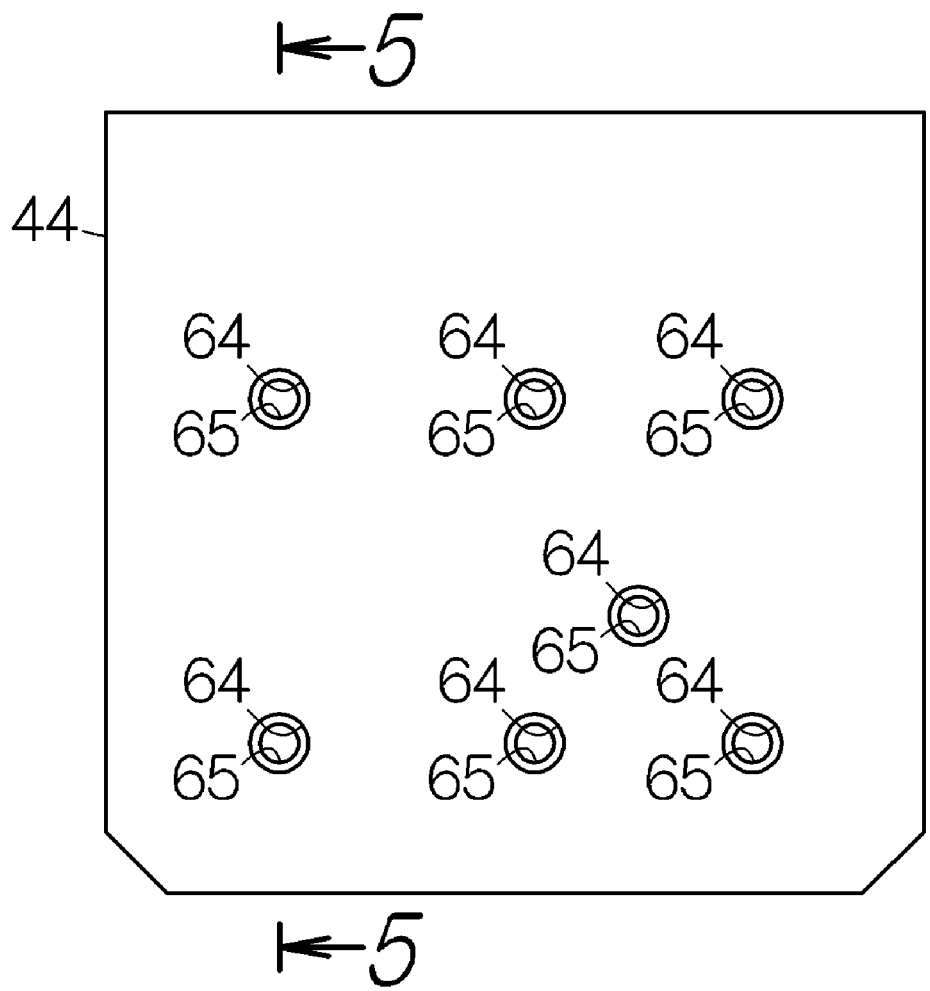
FIG. 4 is a plan view illustrating the upper surface of an urging member, namely the surface of a sleeve guide plate.

As depicted in FIG. 4, the aforementioned through holes 43 each include a first through hole 64 formed in the sleeve guide plate 44. The through hole 64 defines a columnar space. The inner diameter of the first through hole 64, namely the outer diameter of the columnar space, is set larger than the outer diameter of the sleeve 34. Both the driver bit 33 and the sleeve 34 can thus be inserted in the first through hole 64.

Likewise, the through holes 43 each include a second through hole 65 formed in the sleeve stop plate 45. The second through hole 65 defines a columnar space. The second through hole 65 is concentric with the first through hole 64. The inner diameter of the second through hole 65, namely the outer diameter of the columnar space, is set smaller than the outer diameter of the sleeve 34. The sleeve 34 is thus prevented from entering the second through hole 65 after passing through the first through hole 64. The sleeve 34 is received on the sleeve stop plate 45 around the second through hole 65. Simultaneously, the inner diameter of the second through hole 65 is set larger than the outer diameter of the driver bit 33. The driver bit 33 can thus be inserted in the second through hole 65. The driver bit 33 can in this manner protrude from the tip end of the sleeve 34. The sleeve stop plate 45 functions as an inward flange at a position inside the inner diameter of the first through hole 64 outside the inner diameter of the second through hole 65.

Figure 5:
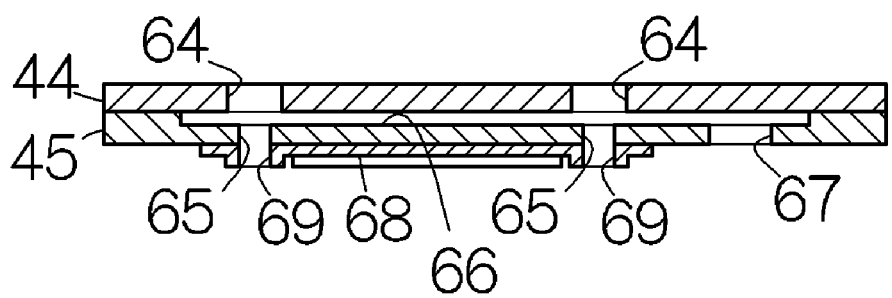
FIG. 5 is a sectional view taken along the line 5-5 in FIG. 4.

As depicted in FIG. 5, a decompression chamber 66 is defined between the sleeve guide plate 44 and the sleeve stop plate 45. The decompression chamber 66 connects the first through holes 64 to the second through holes 65. An air inlet 67 is formed in the sleeve stop plate 45. The air inlet 67 is connected to the decompression chamber 66. A decompressor, not illustrated, is connected to the air inlet 67, for example. The decompressor serves to reduce the pressure in the decompression chamber 66. Air is thus sucked into the decompression chamber 66 through the first and second through holes 64, 65. A suction force is in this manner generated in the first and second through holes 64, 65.

As is apparent from FIG. 5, a plate member 68 made of an electrically-conductive resin is overlaid on the exposed surface, namely the lower surface, of the sleeve stop plate 45. Third through holes 69 are formed in the plate member 68.

The third through holes 69 are set continuous with the corresponding second through holes 65, respectively. The inner diameter of the third through holes 69 is set equal to that of the second through holes 65 in an concentric manner.

Figure 6:
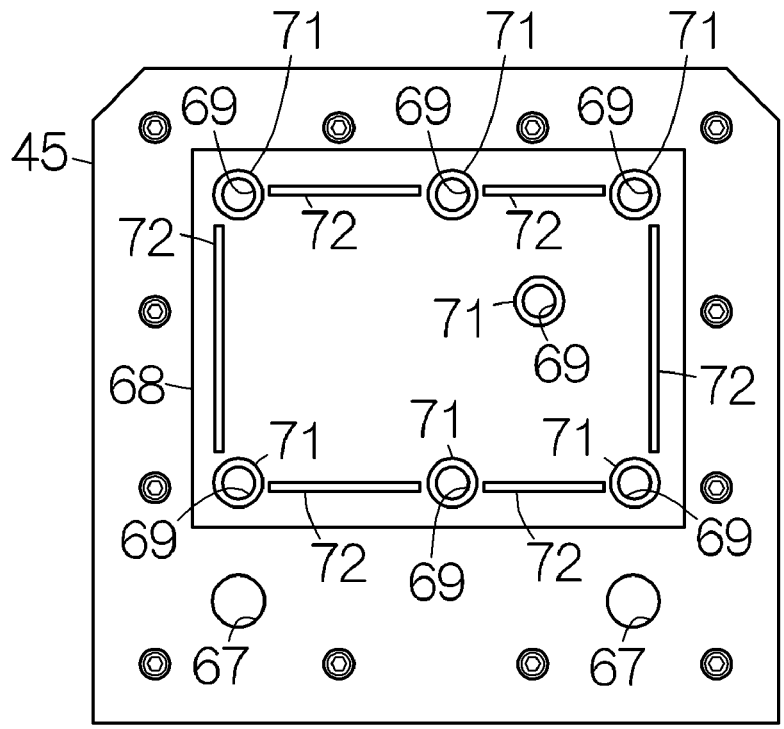
FIG. 6 is a plan view depicting the lower surface of the urging member, namely the surface of a sleeve stop plate.

As depicted in FIG. 6, seven annular projecting walls 71 are formed on the plate member 68. The annular projecting walls 71 surround the corresponding third through holes 69, respectively. The annular projecting walls 71 protrude from the surface of the plate member 68. An urging surface is defined at the top of the individual annular projecting wall 71. Likewise, protrusions 72 are formed on the plate member 68 between six of the annular projecting walls 71, respectively. The protrusions 72 extend on straight lines connecting the annular projecting walls 71 to one another, respectively. The protrusions 72 protrude from the surface of the plate member 68. An urging surface is defined at the top of the individual protrusion 72.

Figure 7:
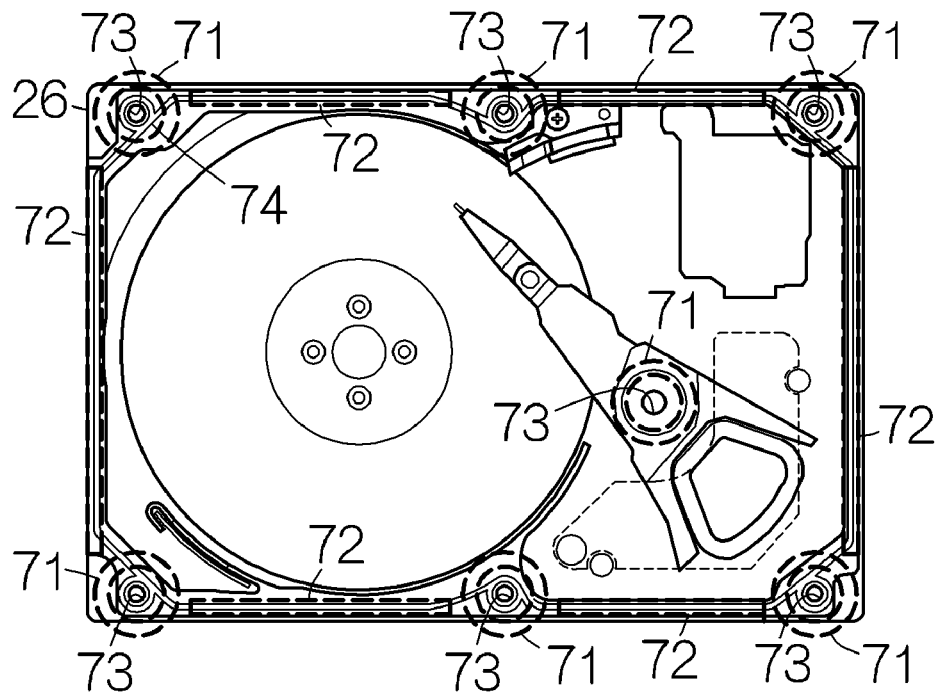
FIG. 7 is a plan view of a hard disk drive, for schematically illustrating the positional relationship between a plate member made of an electrically-conductive resin and the hard disk drive.

As is apparent from FIG. 7, the arrangement of the annular projecting walls 71 reflects that of screw bores 73 formed in the base 26. Specifically, when the plate member 68 is overlaid on the cover 27 on the base 26 in the screwing apparatus 22, the annular projecting walls 71 are urged against annular areas around the screw bores 73, namely bosses, respectively. The bosses serve to avoid deformation of the cover 27. Likewise, the arrangement of the protrusions 72 reflects that of the surrounding wall of the base 26. Specifically, when the plate member 68 is overlaid on the cover 27 on the base 26 in the screwing apparatus 22, the protrusions 72 are received on the surrounding wall. The cover 27 is thus prevented from deformation. Here, the urging surfaces of all the annular projecting walls 71 and the urging surfaces of all the protrusions 72 may extend within a common horizontal plane. A packing 74 is placed on the bosses and the surrounding wall. The packing 74 is made of an elastic member having a predetermined elasticity. The packing 74 surrounds the inner space of the base 26. When the cover 27 is placed on the base 26, the packing 74 are sandwiched between the base 26 and the cover 27. The packing 74 may beforehand be fixed to the cover 27 prior to the screwing operation.

Figure 8:
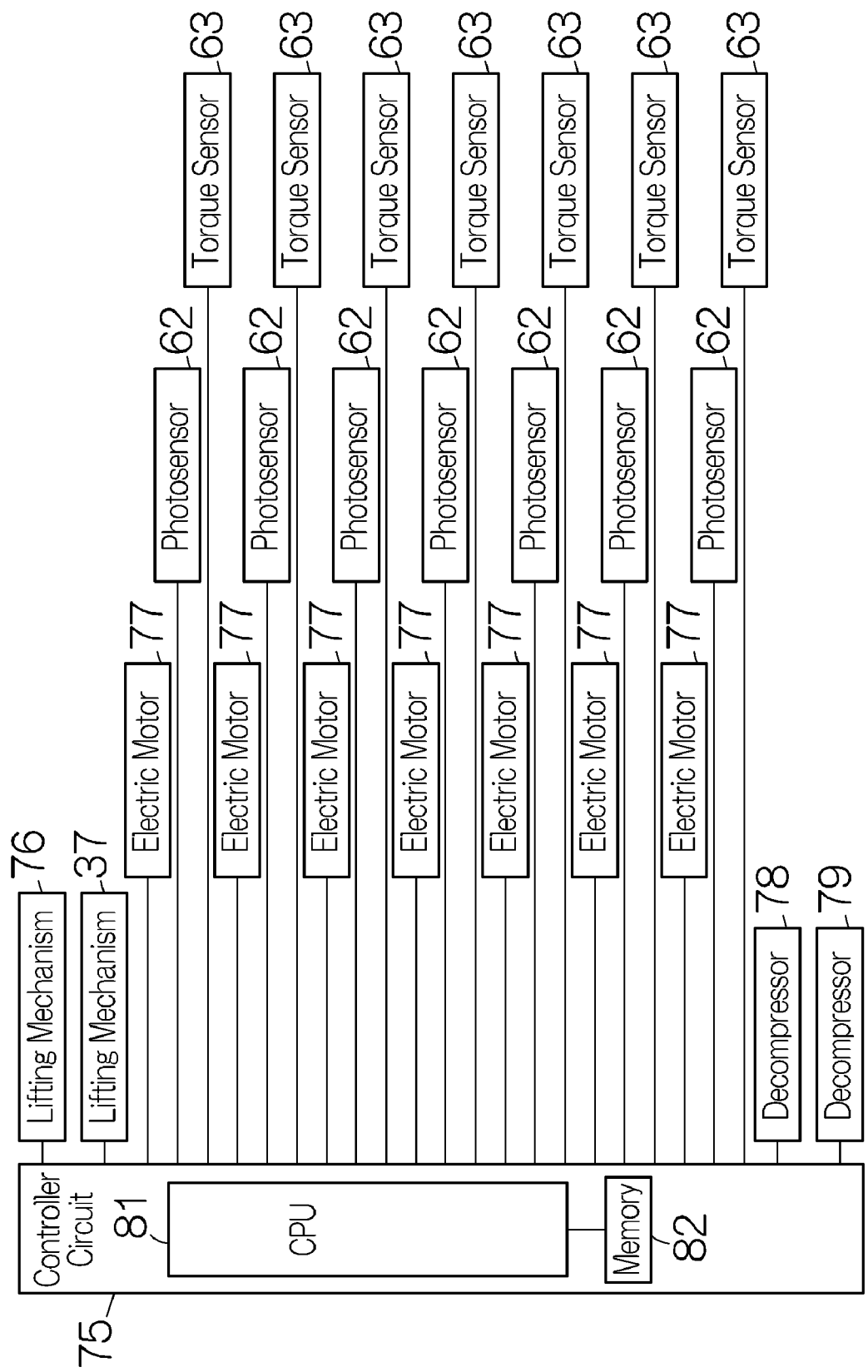
FIG. 8 is a block diagram schematically illustrating the control system of the screwing apparatus.

As depicted in FIG. 8, a controller circuit 75 is incorporated in the screwing apparatus 22. The controller circuit 75 is connected to a lifting mechanism 76 for the screwing head 31, the lifting mechanism 37 for the support member 35, electric motors 77 for the respective driver units 32, the photosensors 62 for the respective driver units 32, the torque sensors 63 for the respective driver units 32, a decompressor 78 for the negative pressure chambers 57, and a decompressor 79 for the decompression chamber 66. The controller circuit 75 controls the operations of the lifting mechanisms 76, 37, the electric motors 77 and the decompressors 78, 79. The controller circuit 75 utilizes signals from the photosensors 62 and the torque sensors 63 for the control. The controller circuit 75 may include a central processing unit (CPU) 81 and a memory 82 connected to the CPU 81. The CPU 81 executes predetermined processing based on a software program and data temporarily stored in the memory 82.

Figure 9:
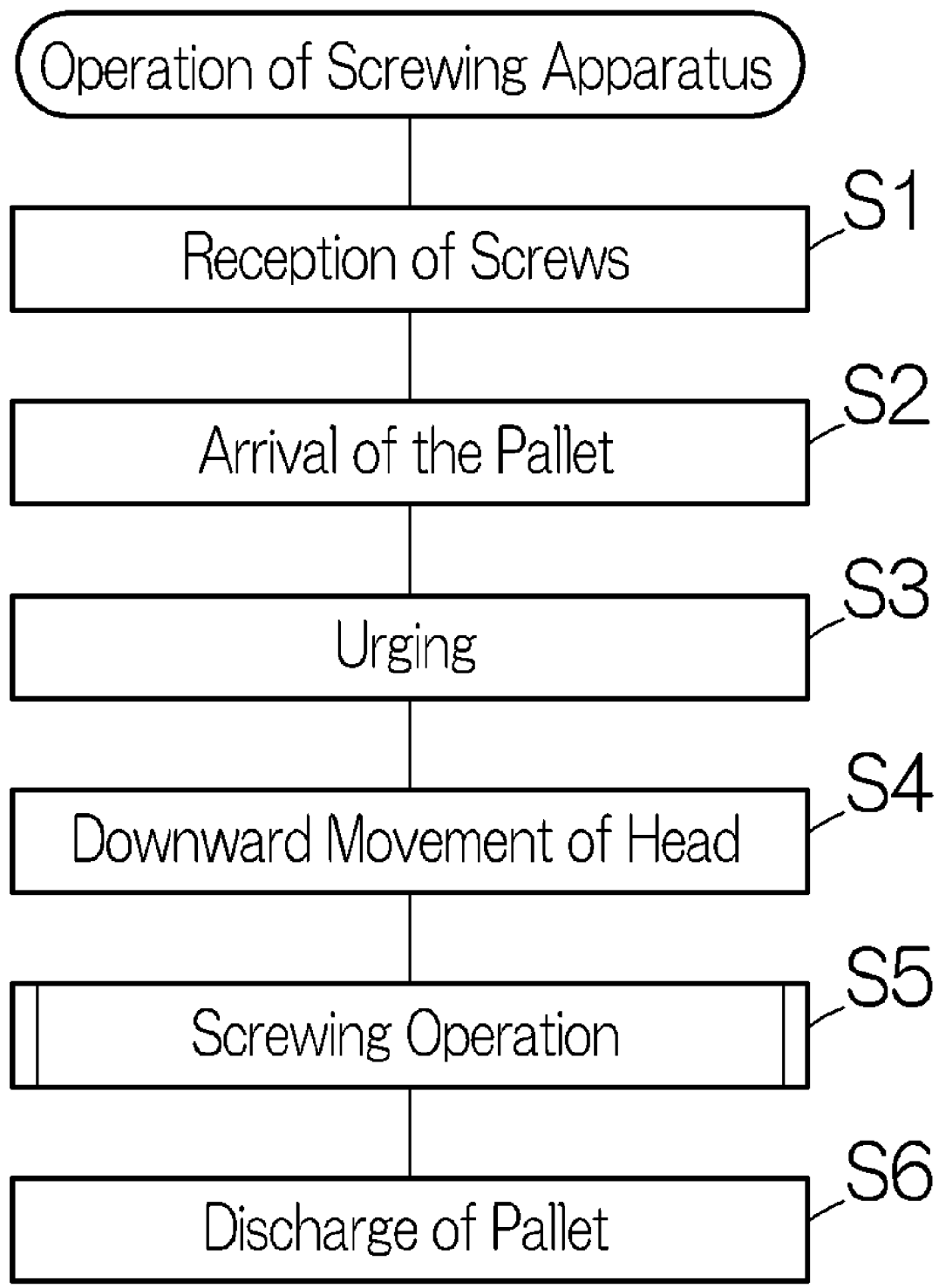
FIG. 9 is a flow chart schematically depicting the operation of the screwing apparatus.

Next, description will be made on the operation of the screwing apparatus 22. The controller circuit 75 of the screwing apparatus 22 executes a predetermined software program. As depicted in FIG. 9, the controller circuit 75 of the screwing apparatus 22 sends out instructions for receiving screws at step S1. A screw is supplied to the individual driver bit 33 from the screw supplying unit 23. The screw supplying unit 23 is configured to arrange screws in accordance with the arrangement of the driver bits 33. As the screwing head 31 moves downward, the tip end of the individual driver bit 33 is engaged with a groove on the screw head. At this point, the controller circuit 75 instructs the decompressor 78 to operate. A negative pressure is generated in the negative pressure chamber 57. The negative pressure chamber 57 serves to generate a suction force at the opening 34a of the sleeve 34. The screw is thus held at the tip end of the sleeve 34. The screwing apparatus 22 then is on standby.

When the pallet 17 is transported to the third station 15c by the first roller conveyor 13, the controller circuit 75 detects the arrival of the pallet 17. The controller circuit 75 sends out instructions for the upward movement of the support member 35 at step S3. The lifting mechanism 37 receives a control signal from the controller circuit 75. The lifting mechanism 37 operates in response to the instructions. The horizontal support surface 36 of the support member 35 is driven to move upward. The pallet 17 is received on the horizontal support surface 36. The protrusions 39 are inserted in the positioning holes 41 of the pallet 17, respectively. In this manner, the pallet 17 is positioned on the horizontal support surface 36.

Figure 10:
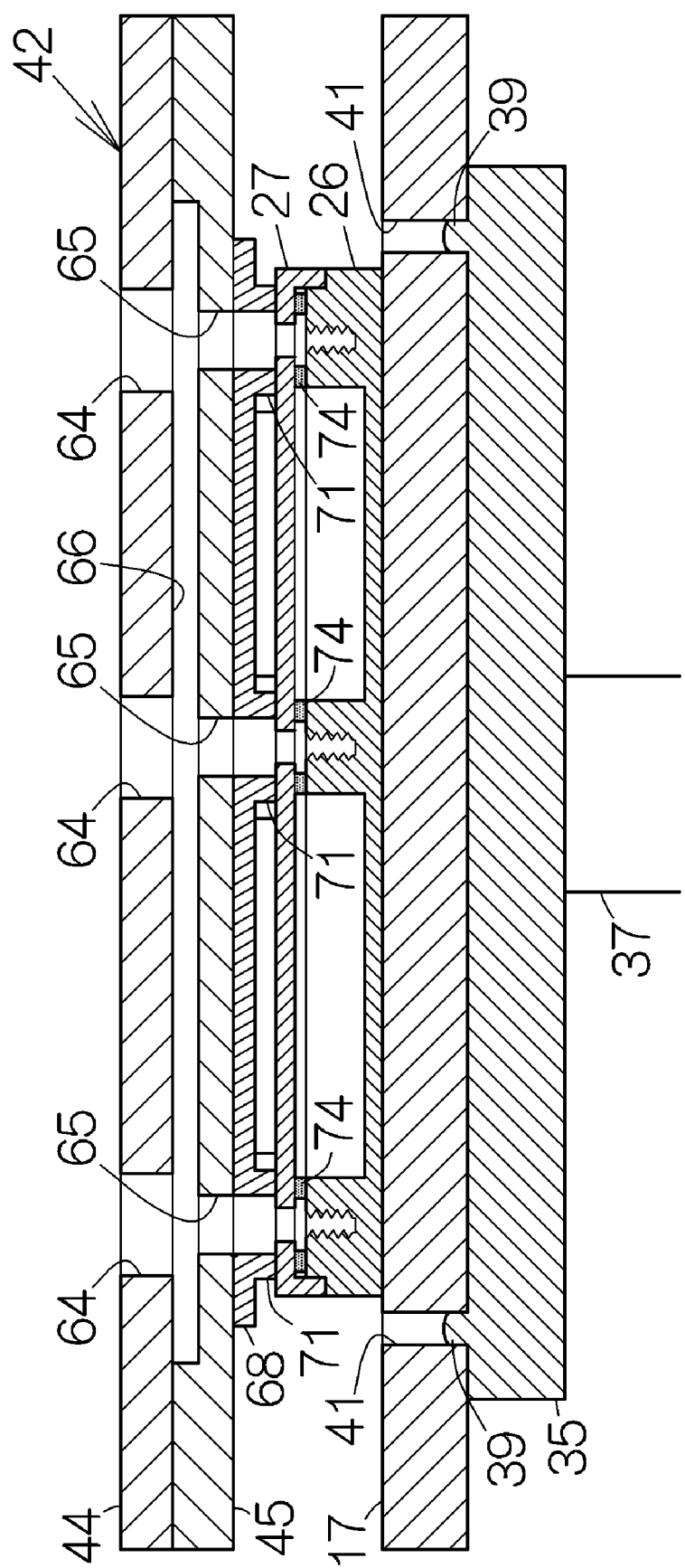
FIG. 10 is a sectional view schematically illustrating a pallet and the base and cover of the hard disk drive, urged against the urging member by a support member.

A further upward movement of the horizontal support surface 36 serves to urge the cover 27 on the pallet 17 against the urging member 42, as depicted in FIG. 10. The pallet 17, the base 26 and the cover 27 are sandwiched between the urging member 42 and the support member 35. The cover 27 is completely engaged on the base 26. The packing 74 is pressed. The inner space of the base 26 is airtightly closed between the cover 27 and the base 26. Since the pallet 17, the base 26 and the cover 27 are sandwiched between the horizontal flat surfaces, the urging force is uniformly applied to the entire packing 74. The levelness of the cover 27 is thus maintained relative to the base 26.

The controller circuit 75 sends out instructions for the downward movement of the screwing head 31 at step S4. The lifting mechanism 76 receives a control signal from the controller circuit 75. The lifting mechanism 76 operates in response to the instructions. The screwing head 31 is driven to move downward. The sleeves 34 of the driver units 32 are inserted into the first through holes 64 of the sleeve guide plate 44, respectively.

Figure 11:
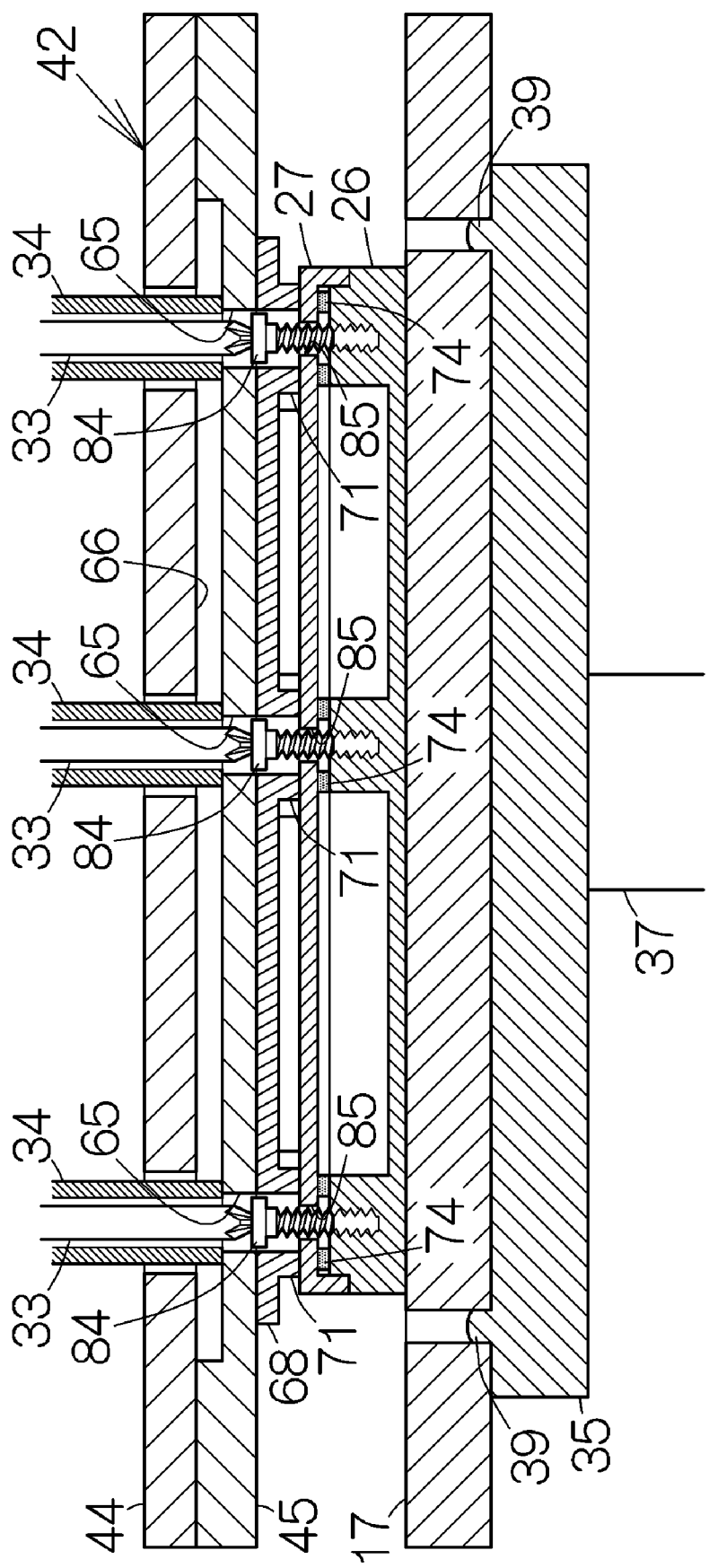
FIG. 11 is a sectional view schematically illustrating screws and the driver bits, entering second through holes formed in the sleeve stop plate.

A further downward movement of the screwing head 31 allows the tip ends of the sleeves 34 to collide against the sleeve stop plate 45. The downward movement of the sleeve 34 of the individual driver unit 32 is restricted. The downward movement of the driver bit 33 of the individual driver unit 32 is maintained. As a result, screws 84 are inserted into through holes 85, respectively, formed in the cover 27, while the screws 84 are detached from the tip ends of the sleeves 34, as depicted in FIG. 11. The individual driver bit 33 allows the second coil spring 55 to shrink so that the individual driver bit 33 keeps moving downward irrespective of the stoppage of the downward movement of the sleeve 34.

Screwing operation is thereafter performed at step S5. The screwing operation will be described later in detail. When all the screws 84 are screwed into the screw bores of the base 26 in this manner, respectively, the cover 27 is fixed on the base 26. Assembly of the hard disk drive 28 is completed. The pallet 17 is discharged from the third station 15c at step S6.

Figure 12:
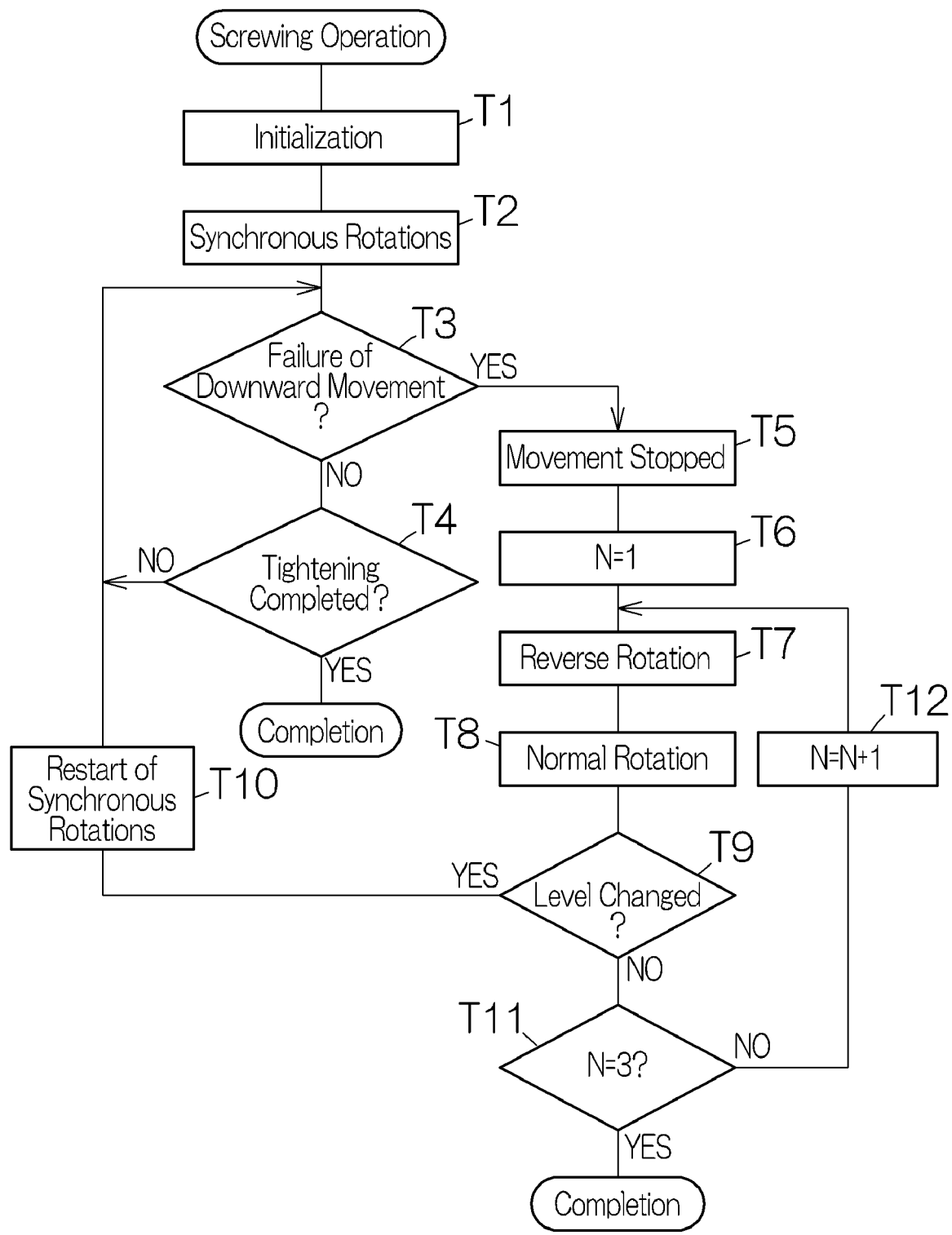
FIG. 12 is a flow chart schematically illustrating the processes of screwing operation.

Next, the screwing operation will be described in detail with reference to FIG. 12. The controller circuit 75 executes the predetermined software program. The controller circuit 75 executes initialization at step T1. A variable N is set at "0 (zero)" in the initialization, for example. At step T2, the controller circuit 75 sends out instructions for the synchronous rotation of the driver bits 33. The electric motor 76 of the individual driver unit 32 receives a control signal from the controller circuit 75. The electric motor 76 exhibits a driving force in response to the instructions. Torque is applied to the individual driver bit 33 around its longitudinal axis. The rotations of all the driver bits 33 are synchronized. Simultaneously, the controller circuit 75 sends out instructions for moving the screwing head 31 downward. An urging force is gradually applied downward to the individual driver bit 33 from the first coil spring 53. The screws 84 are in this manner screwed into the screw bores of the base 26, respectively.

The controller circuit 75 instructs the decompressor 79 to operate. The decompression chamber 66 is decompressed. A negative pressure is generated. The negative pressure in the decompression chamber 66 serves to generate a suction force in the first and second through holes 64, 65. Dust depositing on the tip ends of the driver bits 33 is sucked into the decompression chamber 66.

The controller circuit 75 monitors the individual driver bits 33 for detecting whether or not the individual driver bits 33 suffer from a failure in the downward movement. The photosensor 62 is utilized to detect a failure in the downward movement of the corresponding driver bit 33. If the individual driver bit 33 moves downward concurrently with the downward movement of the screwing head 31, the positional relationship does not change between the driver bit 33 and the body 48. The optical beam OL of the photosensor 62 is thus not interrupted. The photosensor 62 does not output a detection signal. If the individual driver bit 33 does not move downward irrespective of the continuing downward movement of the screwing head 31, the driver bit 33 moves upward relative to the body 48. The driver bit 33 thus interrupts the optical beam OL of the photosensor 62. The photosensor 62 receives a reflected light from the driver bit 33. The photosensor 62 outputs a detection signal. In this manner, it is detected whether or not the movement distance of the individual driver bit 33 reaches a specific value when the screwing head 31 moves downward. If the screw 84 stops rotating because of galling or the like, for example, the driver bit 33 stops moving downward.

Unless the controller circuit 75 observes the driver bits 33 failing to move downward, the controller circuit 75 monitors at step T4 whether or not the tightening of the screws 84 has been completed. The controller circuit 75 refers to the output of the individual torque sensors 63. The controller circuit 75 holds an effective torque representing the completion of the tightening. Upon the completion of the tightening of the screws 84, the screwing operation is completed. The controller circuit 75 sends out instructions for the upward movement of the screwing head 31. The lifting mechanism 76 receives a control signal from the controller circuit 75. The lifting mechanism 76 operates in response to the instructions. The screwing head 31 is driven to move upward. The sleeve 34 and the driver bit 33 of the individual driver unit 32 are released from the urging member 42. The controller circuit 75 then sends out instructions for the downward movement of the support member 35. The lifting mechanism 37 receives a control signal from the controller circuit 75. The lifting mechanism 37 operates in response to the instructions. The horizontal support surface 36 of the support member 35 is driven to move downward. The pallet 17 is received on the first roller conveyor 13. The pallet 17 is separated from the support member 35. The processes of the steps T3, T4 are repeated in a predetermined cycle.

If the controller circuit 75 detects any of the driver bits 33 failing to move downward at step T3, the controller circuit 75 stops the movement of all the driver bits 33 at step T5. The controller circuit 75 supplies a stop signal to the individual electric motor 76 to stop the movement of the driver bits 33. The individual electric motor 76 stops operating in response to the instructions. Simultaneously, the controller circuit 75 sends out instructions for stopping the downward movement of the screwing head 31. The controller circuit 75 subsequently sets "1" for the variable N at step T6.

At step T7, the controller circuit 75 sends out instructions for the reverse rotation of the driver bit or bits 33 that fails or fail to move downward. The electric motor or motors 76 associated with the driver bit or bits 33 failing to move downward receives or receive a control signal from the controller circuit 75. The corresponding electric motor 76 exhibits a driving force in the reverse direction in response to the instructions. Torque is applied to the driver bit 33 in the reverse direction around the longitudinal axis of the driver bit 33. The reverse rotation of the driver bit 33 around its longitudinal axis allows the corresponding screw 84 to move upward. The number of turns (rotation angle) of the reverse rotation may be set at one or two (360 degrees or 720 degrees), for example. Here, the downward movement of the screwing head 31 is kept stopped. The driver bits 33, other than the driver bit 33 having the failure, are kept rested.

At step T8, the controller circuit 75 again sends out instructions for reversing the reverse rotation of the driver bit 33. The electric motor or motors 76 associated with the driver bit or bits 33 of the reverse rotation receives or receive a control signal from the controller circuit 75. The corresponding electric motor 76 exhibits a driving force in the normal direction in response to the instructions. Torque is applied to the driver bit 33 in the normal direction around the longitudinal axis of the driver bit 33. The normal rotation of the driver bit 33 around its longitudinal axis allows the screw 84 to again gradually screw into the screw bores of the base 26, respectively.

At step T9, the controller circuit 75 monitors the level of the driver bit 33. The controller circuit 75 observes a detection signal or signals from the photosensors 62 after the driver bits 33 have performed the normal rotation for a predetermined duration of time, for example. If the screw 84 smoothly keeps screwing into the corresponding screw bore, the driver bit 33 keeps moving downward. As a result, the detection signal from the photosensor 62 disappears. If the screw 84 hardly screws into the corresponding screw bore, the level of the driver bit 33 does not change. The photosensor 62 thus keeps outputting the detection signal.

If the controller circuit 75 observes the disappearance of the detection signal from the photosensor 62 at step T9, the controller circuit 75 determines that the movement distance of the driver bit 33 related to the reverse rotation has caught up the movement distance of the rest of the driver bits 33 at rest. The controller circuit 75 sends out instructions for restarting the rotation of the driver bits 33 at rest at step T10. A control signal is supplied to the electric motors 76 associated with the driver bits 33 at rest from the controller circuit 75. The individual electric motor 76 operates again in response to the instructions. As a result, the rotations of all the driver bits 33 are synchronized again. Simultaneously, the controller circuit 75 sends out instructions for restarting the downward movement of the screwing head 31. In this manner, the screws 84 are screwed with their rotations synchronized. Subsequently, the processes of steps T3 and T4 are repeated again.

If the controller circuit 75 detects a detection signal from the photosensor 62 at step T9, the controller circuit 75 determines at step T11 whether or not the variable "N" is set at "3". If the variable "N" is smaller than "3", the controller circuit 75 adds the value "1" to the value of "N" at step T12. The controller circuit 75 again sends out instructions for the reverse rotation of the driver bit 33 at step T7. The controller circuit 75 again executes the processes of steps T8 and T9. When the variable "N" reaches "3", the controller circuit 75 terminates the screwing operation. The controller circuit 75 determines the screwing operation cannot be completed, namely a failure of tightening the screws 84. The controller circuit 75 sends out instructions for the upward movement of the screwing head 31. Subsequently, the controller circuit 75 sends out instructions for the downward movement of the support member 35. The pallet 17 is received on the first roller conveyor 13. The pallet 17 is separated from the support member 35.

The screwing apparatus 22 realizes application of a uniform urging force to the entire packing 74 prior to the screwing operation. The levelness of the cover 27 on the pallet 17 is thus maintained. The screws 84 can simultaneously be screwed while kept within the equal level with reliability. Even if any of the screws 84 suffers from galling or the like, it is possible to again synchronize the screwing action between all the screws 84. The screws 84 can simultaneously be screwed while kept within the equal level with a higher reliability.

Figure 13:
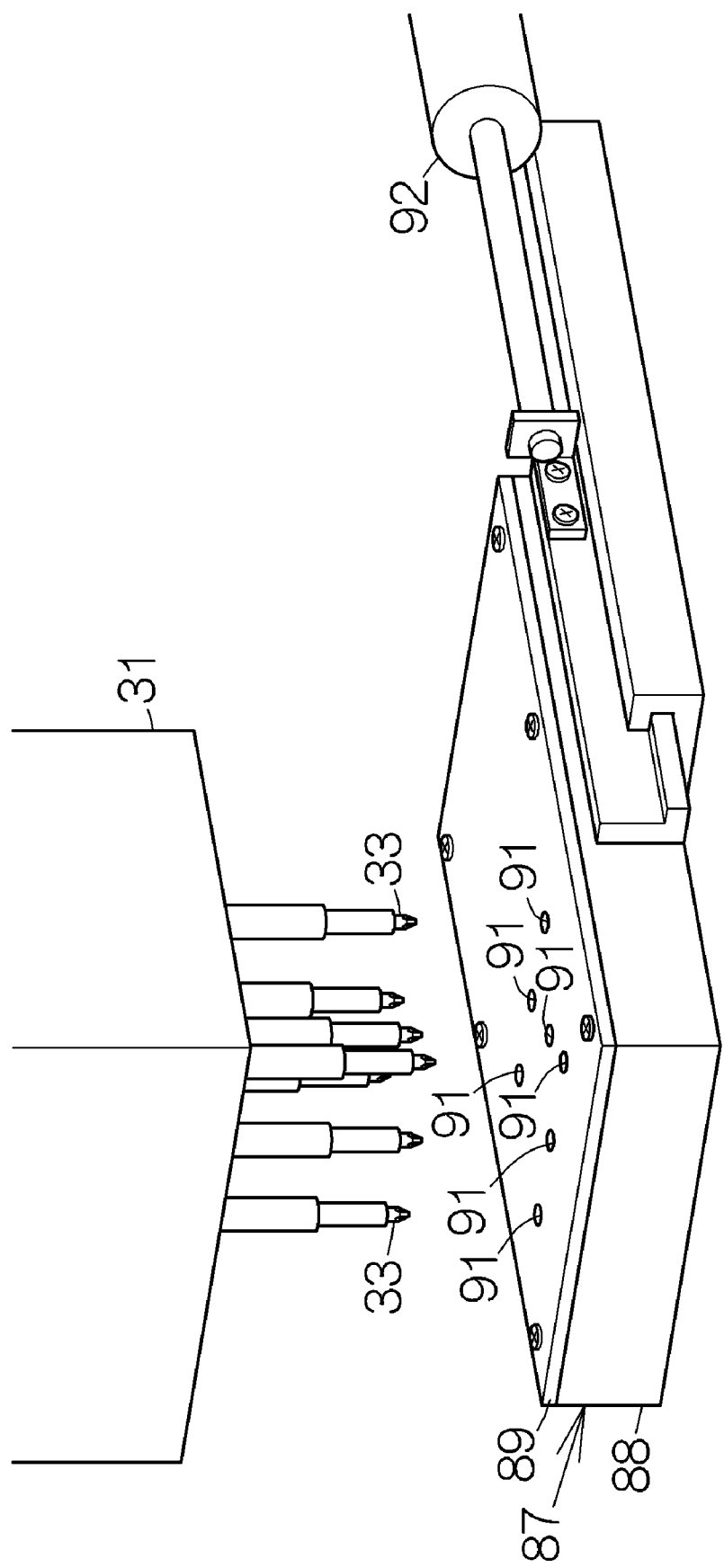
FIG. 13 is a perspective view schematically illustrating the appearance of a cleaning unit.

Next, a brief description will be made on the structure of the cleaning unit 24. As depicted in FIG. 13, the cleaning unit 24 includes an enclosure 87. The enclosure 87 includes an enclosure body 88 defining an inner space of a flat parallelepiped, for example. A cover 89 is coupled to the enclosure body 88 to close the opening of the enclosure body 88. The upper surface of the cover 89 is made of a predetermined horizontal surface. Seven through holes 91 are formed in the cover 89. The arrangement of the through holes 91 reflects that of the driver bits 33. The individual through hole 91 defines a columnar space coaxial with the vertical axis. The inner diameter of the through holes 91 is set smaller than the outer diameter of the sleeves 34 and larger than the outer diameter of the driver bits 33.

An actuator 92 is connected to the enclosure body 88. The actuator 92 drives the enclosure body 88 in a forward and backward direction along the predetermined horizontal surface. The forward and backward movement of the enclosure body 88 in this manner allows the enclosure body 88 to enter the space right under the screwing head 31. The forward and backward movement enables removal of the enclosure body 88 from the space right under the screwing head 31.

Figure 14:
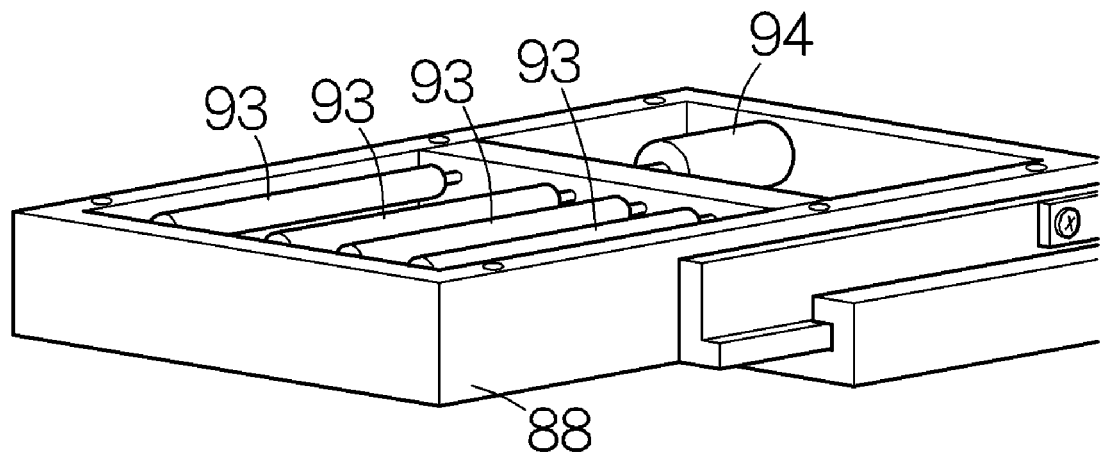
FIG. 14 is a perspective view of the inner space inside an enclosure, for schematically illustrating the inner structure of the cleaning unit.

As depicted in FIG. 14, the cleaning unit 24 includes rotating brushes 93, four of them, placed in the inner space of the enclosure body 88, for example. The individual rotating brush 93 is rotatable around a horizontal axis. The outer peripheries of the rotating brushes 93 are opposed to the through holes 91 of the cover 89. A driving source 94 is connected to the rotating brushes 93. An electric motor may be employed as the driving source 94, for example. A reduction gear, not illustrated, is incorporated to connect the driving source 94 to the rotating brushes 93, for example. The driving source 94 serves to drive the rotating brushes 93 for rotation.

Figure 15:
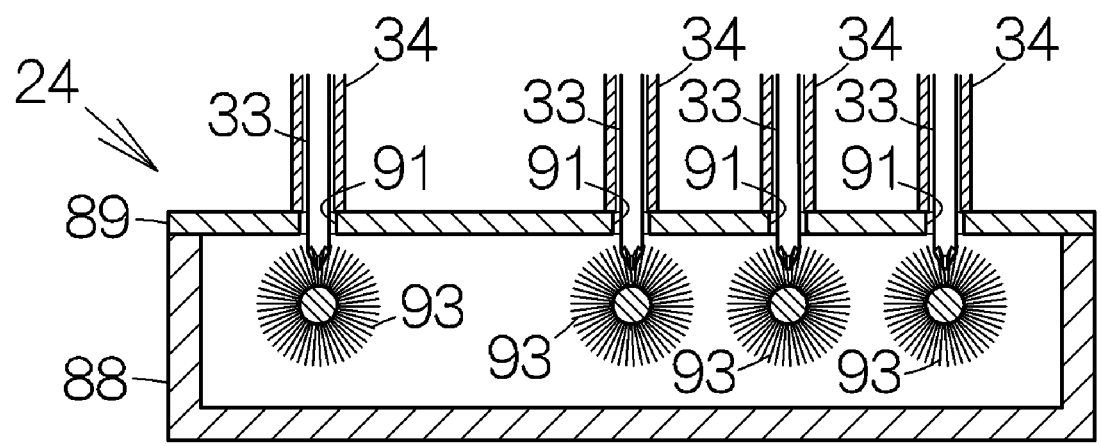
FIG. 15 is a sectional view schematically illustrating the operation of the cleaning unit.

When the screwing head 31 moves downward toward the cleaning unit 24, as depicted in FIG. 15, for example, the sleeve 34 of the individual driver unit 32 is received on the horizontal surface of the cover 89. The downward movement of the sleeves 34 is restricted. The driver bits 33 keeps moving downward. In this manner, the driver bits 33 are exposed from the tip ends of the sleeves 34, respectively. As a result, the driver bits 33 enter the inner space of the enclosure body 88. The tip ends of the driver bits 33 are brought in contact with the rotating brushes 93. When the rotating brushes 93 are driven to rotate, dust is removed from the tip ends of the driver bits 33. In this manner, the tip ends of the driver bits 33 are kept cleaned.

All examples and conditional language recited herein are intended for pedagogical purposes to aid the reader in understanding the invention and the concept contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A screwing apparatus comprising:
    a support member having a horizontal support surface;
    a single urging member having an urging surface opposed to the support surface, the urging surface being parallel to the support surface;
    a driving mechanism configured to drive at least one of the support member and the urging member to move to change a distance between the support member and the urging member; and
    driver bits having tip ends opposed to the support surface, respectively, the driver bits each driven to move toward and away from the urging surface,
    wherein through holes are formed in the urging member to receive the driver bits, respectively, and
    inward flanges are formed on an inner surface of each of the through holes, an inner diameter of the inward flanges being set smaller than an outer diameter of a sleeve receiving a respective one of the driver bits therein.

2. The screwing apparatus according to claim 1, wherein the urging surface is defined in a surface of a plate member fixed to the urging member, the plate member being made of an electrically-conductive resin.

3. A screwing apparatus comprising:
    a support member having a horizontal support surface;
    driver bits each having a tip end opposed to the support surface, the driver bits each driven to move toward and away from the support surface;
    driving sources assigned to the driver bits, respectively, the driving sources each driving corresponding one of the driver bits to rotate around an axis of the corresponding one of the driver bits;
    level detector circuits assigned to the driver bits, respectively, the level detector circuits each detecting a movement distance of corresponding one of the driver bits in an axial direction of the corresponding one of the driver bits; and
    a controller circuit configured to identify a detection of the movement distance smaller than a specific value, the controller circuit configured to supply a control signal for reverse rotation to any of the driving sources, the any of the driving sources being assigned to any of the driver bits that is related to the movement distance smaller than the specific value.

4. The screwing apparatus according to claim 3, wherein the controller circuit is configured to supply a control signal for stoppage of rotation to any of the driving sources that is associated with remaining one or ones of the driver bits other than the any of the driver bits that is related to the movement distance smaller than the specific value.

5. The screwing apparatus according to claim 4, wherein the controller circuit is configured to supply a control signal for canceling the stoppage of the rotation to the any of the driving sources that is associated with the remaining one or ones of the driver bits related to the control signal for the stoppage of the rotation, when the movement distance of the any of the driver bits that is related to the control signal for the reverse rotation reaches the movement distance of the remaining one or ones of the driver bits related to the control signal for the stoppage of the rotation.

6. A screwing apparatus comprising:
   a support member having a horizontal support surface;
   driver bits each having a tip end opposed to the support surface, the driver bits each driven to move toward and away from the support surface;
   driving sources assigned to the drive bits, respectively, the driving sources each driving corresponding one of the driver bits to rotate around an axis of the corresponding one of the driver bits;
   torque sensors assigned to the driver bits, respectively, the torque sensors each detecting torque on corresponding one of the driver bits; and
   a controller circuit configured to identify a detection of the torque larger than a specific value, the controller circuit configured to supply a control signal for reverse rotation to any of the driving sources, the any of the driving sources being assigned to any of the driver bits that is related to the torque larger than the specific value, wherein the controller circuit is configured to supply a control signal for stoppage of rotation to any of the driving sources that is associated with remaining one or ones of the driver bits other than the any of the driver bits that is related to the toque larger than the specific value.

7. The screwing apparatus according to claim 6, wherein the controller circuit is configured to supply a control signal for canceling the stoppage of the rotation to the any of the driving sources that is associated with the remaining one or ones of the driver bits related to the control signal for the stoppage of the rotation, when the movement distance of the any of the driver bits that is related to the control signal for the reverse rotation reaches the movement distance of the remaining one or ones of the driver bits related to the control signal for the stoppage of the rotation.

* * * * *